Aug. 2, 1938.  H. S. CHRISTENSEN ET AL  2,125,768

ANIMAL MARKER

Filed Nov. 9, 1937

Inventors
Harry S. Christensen
Donal D. Draper
By Clarence A. O'Brien
Hyman Berman
Attorneys Patented Aug. 2, 1938

2,125,768

UNITED STATES PATENT OFFICE 2,125,768

ANIMAL MARKER

Harry S. Christensen and Donal D. Draper, Oxford, Nebr.

Application November 9, 1937, Serial No. 173,675

2 Claims. (Cl. 40—23)

Our invention relates to improvements in markers for cattle particularly steers, also horses and hogs, and the primary object of the invention is to provide an inexpensive device readily attachable to and detachable from various parts of such animals, for instance the tail or legs, to identify the animal by number when selling the same.

Another object is the provision of a device of the character and for the purpose above set forth which may be attached to the animal without injuring the same and which cannot become detached by movement of the member to which it is applied.

Other, and subordinate objects, are also comprehended by our invention, all of which together with the exact nature of our improvements will be readily understood when the succeeding description and claims are read with reference to the drawing accompanying and forming part of this specification.

Figure 1:
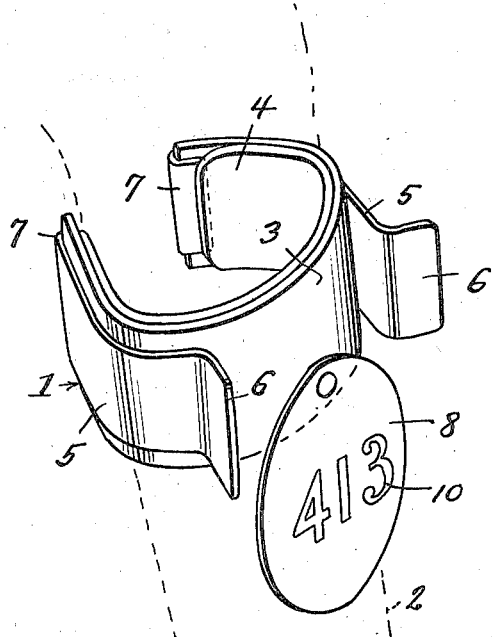
Figure 1 is a view in perspective of a preferred embodiment of our invention.
Figure 2:
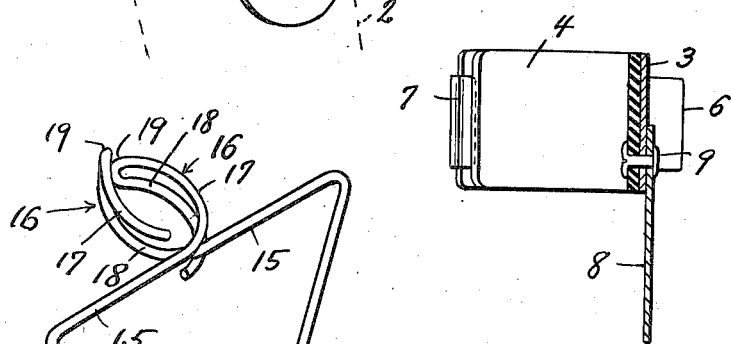
Figure 2 is a view in vertical section taken on the line 2—2 of Figure 1.

Referring to the drawing by numerals, in the preferred embodiment illustrated in Figures 1 and 2, the marker of our invention comprises a reactive clip 1 adapted to be spread apart at its rear end to position the same around a selected part of the animal, for instance, the tail indicated at 2 by dotted lines. The clip 1 comprises a flat, split band 3, substantially U-shaped, of suitable reactive metal or material having secured to the inner face thereof, in any suitable manner, a lining band 4 of soft material such as rubber. A pair of spreading members 5, also of flat metal, are secured to the free, rear end of the band 3 to extend along opposite sides thereof, respectively, said members terminating in a pair of opposed ear like finger grips 6 extending forwardly from the band at the front thereof and whereby the spreading members 5 may be manipulated to spread the rear ends of the clip 1 apart for the purpose above set forth. Preferably the spreading members 5 are attached to the rear ends of the band 3 by bending around the same, as at 7, and welding thereto. As best shown in Figure 1 the lining band 4 overlaps the bent ends 7 of the spreading members 5 to prevent said bent ends from chafing the animal. A disk-like tag 8 of suitable metal, is secured to the front of the band 3 to depend therefrom intermediate the hand grips 6. The tag 8 may be riveted, as at 9, to said band 3 or welded thereto if desired. The tag 8 has delineated thereon, as shown at 10, a number or other identifying symbols.

The described marker is designed to be made in different sizes to clamp around different members of animals and sufficiently reactive to securely clamp the same in place without causing discomfort or injury to the animal.

Figure 3:
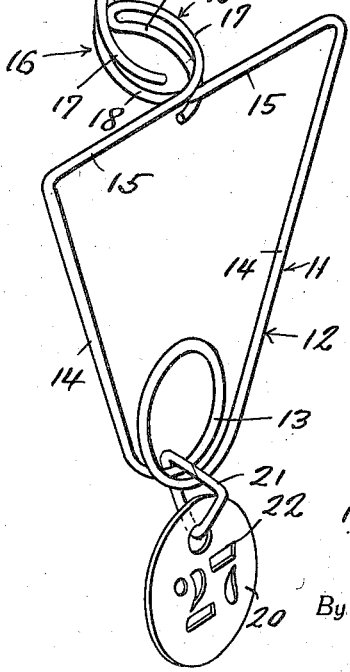
Figure 3 is a view in perspective of a modified form of the invention.

The modified form of the invention, shown in Figure 3, comprises a clip 11 formed of a single length of resilient wire coiled and bent upon itself to provide a substantially triangular frame 12 including a lower looped part 13, a pair of upwardly divergent resilient side arms 14 extending from said looped part, and a pair of straight, parallel arms 15 extending inwardly from the side arms 14 in opposed relation and terminating in a pair of opposed arcuate clamping jaws 16. The jaws 16 each comprise an upper and lower strand of wire 17 and 18, and a free rounded end 19 for facilitating gripping the member of the animal to which the device is applied and to prevent snagging the member during application of the jaws thereto. As will be clear, by forcing the side arms 14 toward each other the jaws 16 may be separated to apply the device and under reaction of said arms 14 said jaws will assume clamping relation. A tag 20 similar to tag 8 is secured to the looped part 13 by means of a link 21. The tag 20 has an identifying number 22 stamped out of the same.

Our invention, together with its advantages, will, it is believed, be clearly understood from the foregoing without further explanation.

Manifestly, the invention is susceptible of modification in other respects than as disclosed and right is herein reserved to all such modifications falling within the scope of the subjoined claims.

What we claim is:

1. A marker to be applied to a leg or to the tail of an animal and comprising a resilient clip embodying a substantially U-shaped outer band of flat resilient metal having rear free ends urged together and adapted to be spread apart, an inner lining band of soft material secured to the outer band, a pair of spreader members of flat metal extending along opposite sides of said outer band and terminating at the front of said outer band in a pair of opposed laterally spaced hand grips, said spreader members being bent around the rear free ends of the outer band, respectively, and secured thereto, and an identification tag secured to the front of the outer band to depend therefrom.

2. A marker to be applied to a leg or to the tail of an animal and comprising a resilient clip embodying a substantially U-shaped outer band of flat resilient metal having rear free ends urged together and adapted to be spread apart, an inner lining band of soft material secured to the outer band, a pair of spreader members of flat metal extending along opposite sides of said outer band and terminating at the front of said outer band in a pair of opposed laterally spaced hand grips, said spreader members being bent around the rear free ends of the outer band, respectively, and secured thereto, and an identification tag secured to the front of the outer band.

HARRY S. CHRISTENSEN.
DONAL D. DRAPER.